UNITED STATES PATENT OFFICE.

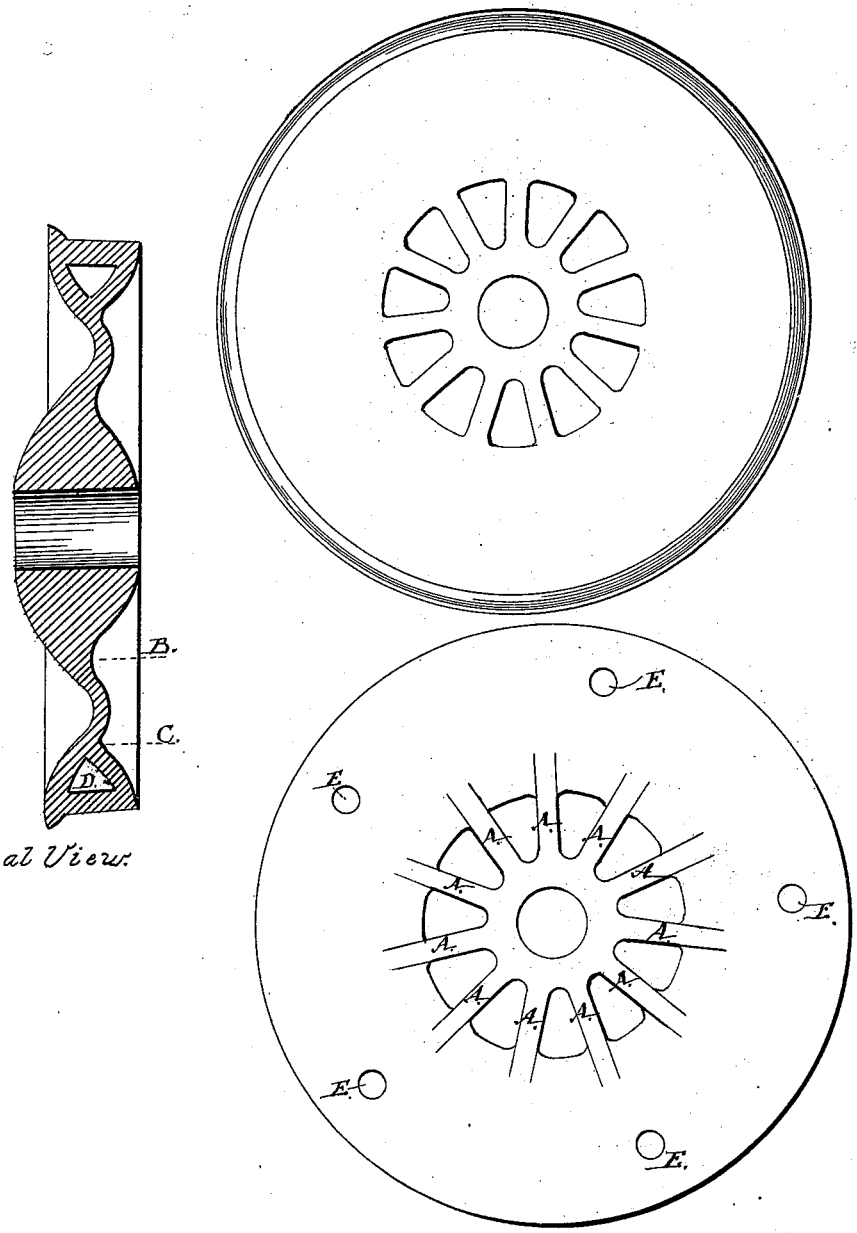

JAMES M. COOK, OF TAUNTON, MASSACHUSETTS.

CAST-IRON CAR-WHEEL.

Specification of Letters Patent No. 6,022, dated January 9, 1849.

*To all whom it may concern:*

Be it known that I, JAMES M. COOK, of Taunton, in the county of Bristol and State of Massachusetts, have invented a new and Improved Method of Constructing Cast-Iron Wheels for Railroad and other Purposes; and I do hereby declare that the following is a full and exact description.

The nature of my invention consists in the method or form of constructing wheels for railroads or other purposes in such a manner as to combine the spoke wheel—the single plate wheel and double plate wheel (so that the wheel may be of light weight) and possesses the necessary strength.

To enable others skilled in the art to make and use my invention I will proceed to describe its construction. The hub may be made in sections and secured with wrought iron bands or it may be made solid (and secured with bands or otherwise). From the hub extends a sufficient number of spokes or arms, as shown in accompanying drawings, back view, marked A, one third of the distance more or less between the hub and rim connecting with a single undulating plate. This single undulating plate extends one third of the distance, more or less, from hub to rim—see drawings—sectional view from B to C, then (connect with two plates or divide into two parts as shown at D, sectional view, extending one third of the distance, more or less, from hub to rim. The dividing of the plate is made by setting a core in the mold which core is held in its proper place by any number of supports, (say five) as is shown in drawing, back view, marked E, which represent holes for removing the core after the wheel is made.

What I claim as my invention and desire to secure by Letters Patent is—

The constructing of wheels for railroads, or other purposes, with spokes—single plate and double plate combined, as herein described.

JAMES M. COOK.

Witnesses:
   JAMES P. ELLIS,
   A. E. SWASEY.